US009335477B2

(12) United States Patent
Fontaine et al.

(10) Patent No.: US 9,335,477 B2
(45) Date of Patent: May 10, 2016

(54) SPATIAL DIVISION DIVERSITY IN PHOTONIC INTEGRATED CIRCUITS

(71) Applicant: Alcatel-Lucent USA Inc., Murray Hill, NJ (US)

(72) Inventors: Nicolas K Fontaine, Holmdel, NJ (US); David T Neilson, Holmdel, NJ (US); Roland R Ryf, Holmdel, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 161 days.

(21) Appl. No.: 13/827,205

(22) Filed: Mar. 14, 2013

(65) Prior Publication Data

US 2014/0079353 A1   Mar. 20, 2014

Related U.S. Application Data

(60) Provisional application No. 61/701,427, filed on Sep. 14, 2012.

(51) Int. Cl.
*G02B 6/26*      (2006.01)
*G02B 6/28*      (2006.01)
*G02B 6/12*      (2006.01)

(52) U.S. Cl.
CPC .. *G02B 6/28* (2013.01); *G02B 6/12* (2013.01); *G02B 6/2804* (2013.01); *Y10T 29/49826* (2015.01)

(58) Field of Classification Search
CPC ....................................................... G02F 1/3132
USPC .............................................................. 385/28
See application file for complete search history.

(56) References Cited

U.S. PATENT DOCUMENTS

| 5,937,115 | A | * | 8/1999 | Domash | 385/16 |
| 6,160,942 | A | * | 12/2000 | Watanabe | 385/122 |
| 2005/0275921 | A1 | * | 12/2005 | Haus et al. | 359/247 |
| 2011/0129236 | A1 | * | 6/2011 | Jeong | 398/212 |
| 2013/0068937 | A1 | * | 3/2013 | Ryf | 250/227.11 |

* cited by examiner

*Primary Examiner* — Eric Wong
(74) *Attorney, Agent, or Firm* — Parker Justiss, PC

(57) ABSTRACT

An apparatus includes a plurality of input optical couplers and a plurality of output optical couplers. The input optical couplers are placed in a pattern to receive light from multiple locations of an end face of an input multimode optical fiber (MMOF). The output optical couplers are placed in a pattern to provide light to multiple locations of an end face of an output MMOF. The apparatus further includes a plurality of single-mode optical paths. Each of the paths is connected to a corresponding one of the input optical couplers and a corresponding one of the output optical couplers.

23 Claims, 8 Drawing Sheets

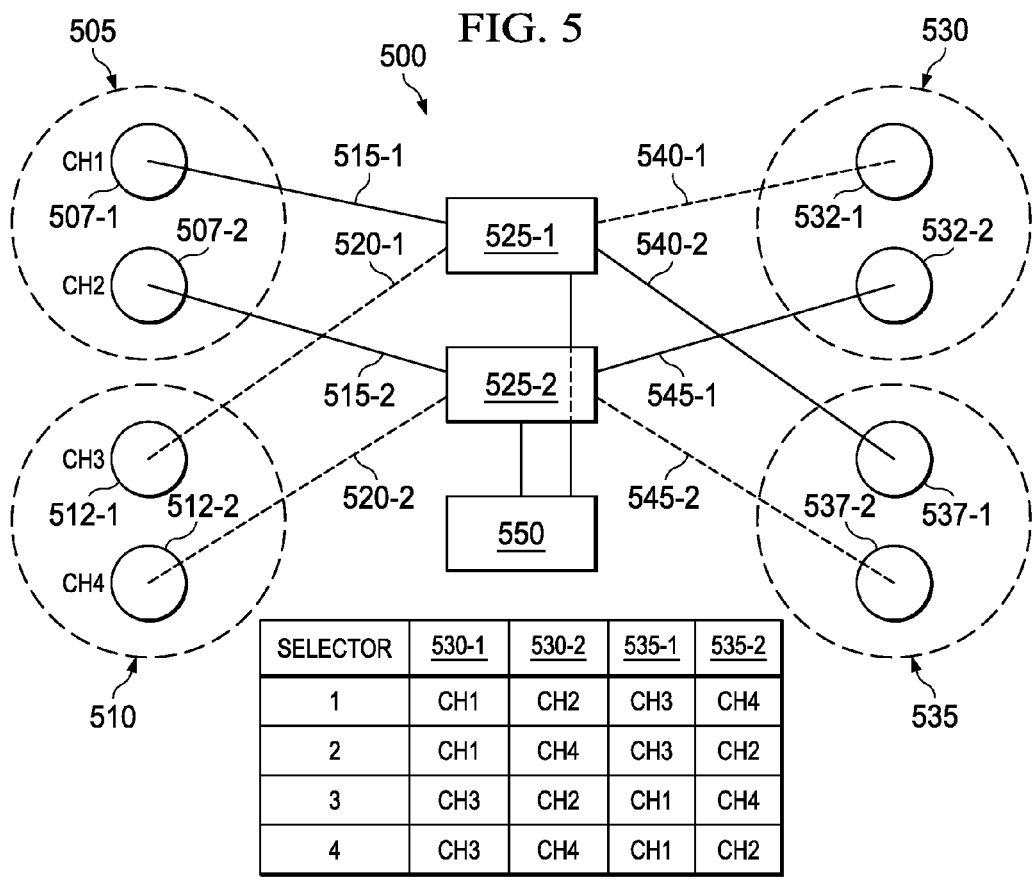

SPATIAL DIVISION DIVERSITY IN PHOTONIC INTEGRATED CIRCUITS

CROSS REFERENCE TO RELATED APPLICATIONS

This application claims the benefit of previously filed U.S. Provisional Patent Application No. 61/701,427 entitled "Spatial Division Diversity in Photonic Integrated Circuits", filed Sep. 14, 2012, which is incorporated herein by reference in its entirety.

TECHNICAL FIELD

This application is directed, in general, to optical communications systems and methods.

BACKGROUND

This section introduces aspects that may be helpful to facilitating a better understanding of the inventions. Accordingly, the statements of this section are to be read in this light and are not to be understood as admissions about what is in the prior art or what is not in the prior art.

Recent advances in spatial division multiplexing (SDM) of optical signals show significant promise for increasing the data-carrying capacity of optical fibers. Current development efforts focus primarily on couplers to connect single-mode fibers to multi-mode fibers. Achieving the full potential of multimode fibers will also benefit from addressing other aspects of system design for processing spatially multiplexed optical signals.

SUMMARY

One aspect provides an apparatus that includes a plurality of input optical couplers and a plurality of output optical couplers. The input optical couplers are placed in a pattern to receive light from multiple locations of an end face of an input multimode optical fiber (MMOF). The output optical couplers are placed in a pattern to provide light to multiple locations of an end face of an output MMOF. The apparatus further includes a plurality of single-mode optical paths. Each of the single-mode paths is connected to a corresponding one of the input optical couplers and a corresponding one of the output optical couplers.

Another aspect provides a method, e.g. for forming an apparatus. The method includes coupling a first single-mode optical path to a first input optical coupler and a first output optical coupler. The method further includes coupling a second single-mode optical path to a second input optical coupler and a second output optical coupler. The first and second input optical couplers are placed in a pattern to receive light from multiple locations of an end face of an input MMOF, and the first and second output optical couplers are placed in a pattern to provide light to multiple locations of an end face of an output MMOF.

In any embodiment the input and output MMOFs may support N spatial modes, the patterns may include M optical couplers, and N may be equal to M. In some embodiments M may be greater than N. In any embodiment the optical couplers may be implemented as waveguide grating couplers. In any embodiment the optical couplers may be implemented as laser-inscribed 3D waveguides. In any embodiment the single-mode optical paths may each include one of a plurality of nominally identical optical devices.

In any embodiment the single-mode optical paths may include single-mode planar waveguides implemented on a planar photonic circuit substrate. In any embodiment the optical paths may each include a silicon core region formed over a planar silicon substrate. In other embodiments each of the single-mode optical paths may include a single-mode optical fiber. In any embodiment the single-mode optical paths may be configured to impose about a same phase delay on an optical signal propagating between the input coupler and the output coupler connected thereto. In any embodiment each single-mode optical path may be configured to impose about a same attenuation on an optical signal propagating between the input coupler and the output coupler connected thereto. In any embodiment each single-mode optical path may be configured to impose about a same phase delay and attenuation on an optical signal propagating between the input coupler and an output coupler connected thereto. In any embodiment the waveguides may each have about a same physical path length.

In any embodiment each of the optical paths may include a path through an optical switch. In some such embodiments the optical switch may be a wavelength-selective optical switch. In some embodiments each of the optical paths may include a path through an optical cross-connect. In some such embodiments the optical devices may include an optical switch configured to route light from the input MMOF to a selectable one of a plurality of output MMOFs. In other embodiments the optical devices may include an optical switch configured to route light from a selectable one of a plurality of input MMOFs to the output MMOF. Any embodiment may further include the input MMOF and the output MMOF. In any embodiment the optical paths may be configured to propagate signals in the optical S, C, or L bands.

BRIEF DESCRIPTION

Reference is now made to the following descriptions taken in conjunction with the accompanying drawings, in which:

FIG. 1 illustrates a system, e.g. an embodiment of an optical system configured to perform an optical function on one or more spatially diverse components of a received spatially-diverse optical signal, including optical coupling elements configured to receive light from or provide light to a MMOF;

FIGS. 2A-2C respectively illustrate aspects of spatial mode separation and combination between a multimode fiber and a single-mode optical path;

FIG. 5 illustrates an embodiment of a system configured to switch channels of multimode optical signals between multiple propagating modes of one or more input MMOFs and one or more output MMOFs using a plurality of optical switches;

DETAILED DESCRIPTION

In many optical systems it is desirable to perform one or more optical processing operations, e.g. switching, filtering, and/or wavelength selective switching. To increase data carrying capacity of optical fibers, multimode (MM), or spatially diverse, signal transmission is an area of active interest.

As appreciated by those skilled in the optical arts, a multimode fiber may propagate an optical signal having a plurality of optical modes. The optical modes are preferably orthogonal, e.g. transfer negligible energy between each other. Under such conditions each propagation mode may be used as a separate optical channel. The channels may be used to transmit independent data streams, or data may be multiplexed between the channels. In either case, the effective data capacity of the multimode fiber is greater than a similar single-mode fiber.

In many cases, mature single-mode (SM) devices exist to perform such operations on single-mode optical signals. However, viable multimode analogs of such devices typically do not yet exist, or are not technically mature. Characteristics of acceptable spatially diverse optical devices include preservation of the spatial diversity of the optical signal being processed, low propagation-mode-dependent losses and/or low dispersion. The practical success of spatially-diverse optical systems is expected to benefit from the successful development of such components.

The inventors have discovered that by separating optical signals propagating via a MM path into separate signal paths, preserving the intensity and phase relationships between the spatially diverse optical signals at the beginning and end of the separate paths, the separated signal components may be re-coupled to an output multimode optical fiber to produce a processed propagating multimode output signal. This scheme may preserve some advantages of spatial diversity in the optical path, e.g. greater data capacity of the optical signals and/or fewer optical paths and smaller device size, while allowing the use of bulk or planar optical components that are well-characterized, mature, or inexpensive.

Figure 1:
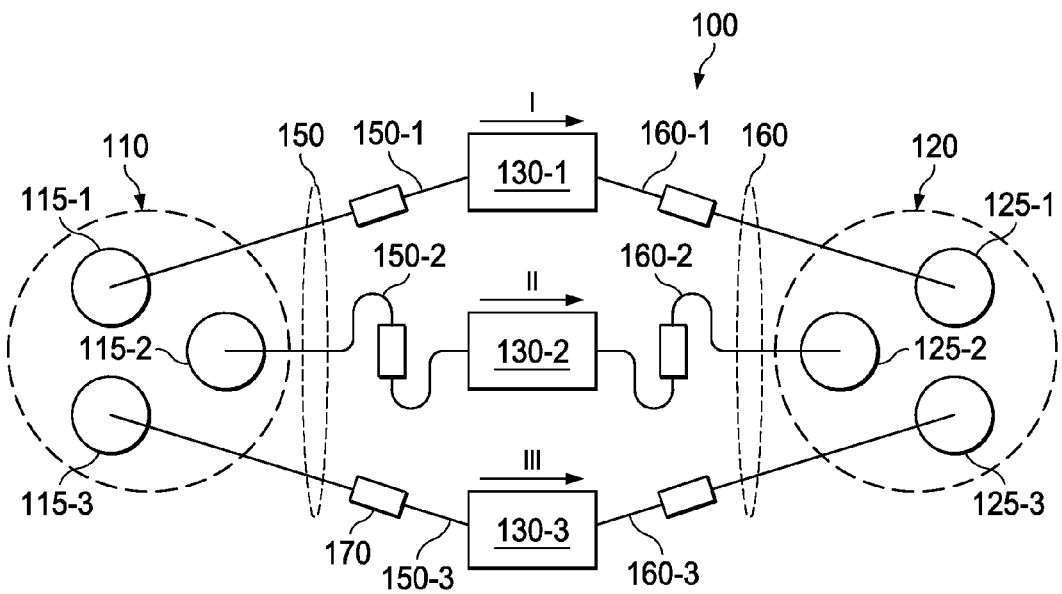

FIG. 1 illustrates a system 100, e.g. an embodiment of an optical apparatus configured to operate on one or more spatially diverse components of a received multimode optical signal. Without limitation thereto the system 100 is described as a planar optical device, e.g. a photonic integrated circuit (PIC). Other embodiments may include bulk optical components to implement one or more sing-mode optical paths.

The system includes an input optical mode coupler 110 and an output optical mode coupler 120, and optical functions 130-1, 130-2 and 130-3. The terms "input" and "output" are used without limitation for convenience of the discussion, while noting that in some embodiments the operation of the system 100 may be symmetrical such that the output mode coupler 120 may operate as an input and the mode coupler may operate as an output. The input mode coupler 110 includes a plurality of optical coupling elements 115-1, 115-2 and 115-3 that may operate as beam samplers. The output mode coupler 120 includes a plurality of optical coupling elements 125-1, 125-2 and 125-3 that may operate as beam sources. The mode couplers 110 and 120 are not limited to having any particular number of coupling elements. The number of coupling elements may expressed generally herein as M, with the mode couplers 110 and 120 being illustrated without limitation for the case that M=3.

In one respect the mode coupler 110 is configured to couple to an orthogonal combination of the spatial propagation modes of an optical signal received via an input multi-mode optical fiber (not shown). The coupling elements 115-1 ... 115-3 may be viewed as being configured to sample the radiation pattern of the spatial propagation modes of an optical signal received via the input multi-mode optical fiber. As developed further below the coupling elements 125-1 ... 125-3 may then recreate this spatial pattern to be coupled to an output multi-mode fiber (not shown). Thus the mode coupler 120 may couple to an orthogonal combination of the spatial propagation modes of an optical signal delivered to the output multi-mode optical fiber.

The coupling elements 115-1 ... 115-3 and 125-1 ... 125-3 may be provided by, e.g., appropriately configured waveguide grating couplers, a photonic lantern with the correct geometrical arrangement, 3D fan out structures, or turning mirrors. Such couplers are known to those skilled in the optical arts. Each coupling element may couple a vertically propagating optical signal from, e.g. an optical fiber, to a horizontal propagating mode of, e.g. a planar waveguide. Some additional aspects of such coupling elements are described in Nicolas Fontaine, et al. "Space-division multiplexing and all-optical MIMO demultiplexing using a photonic integrated circuit", Optical Fiber Communication Conference, Mar. 4, 2012, and Dirk Tallaert, et al., Optics Letters, Vol. 29, Issue 23, pp. 2749-2751 (2004), each of which is incorporated herein by reference.

The system 100 further includes optical waveguides 150 and 160, e.g. single-mode planar waveguides. The waveguides 150 include M waveguide cores, e.g. 150-1, 150-2 and 150-3. The waveguides 160 also includes M waveguide cores, e.g. 160-1, 160-2 and 160-3. The waveguide cores may be referred to herein simply as waveguides for convenience. The waveguides 150 and 160 may be configured to propagate optical signals, e.g. in the optical S, C or L bands. The waveguide 150-1, optical function 130-1 and waveguide 160-1 form an optical path from the coupling element 115-1 to the coupling elements 125-1, designated path I. The waveguide 150-2, optical function 130-2 and waveguide 160-2 form an optical path from the coupling element 115-2 to the coupling elements 125-2, designated path II. The waveguide 150-3, optical function 130-3 and waveguide 160-3 form an optical path from the coupling element 115-3 to the coupling elements 125-3, designated path III. As described further below, the optical paths I-III are configured such that intensities and phases of optical signals received at the optical coupling elements 115-1 ... 115-3 are substantially preserved at the coupling elements 125-1 ... 125-3.

Figure 2A:
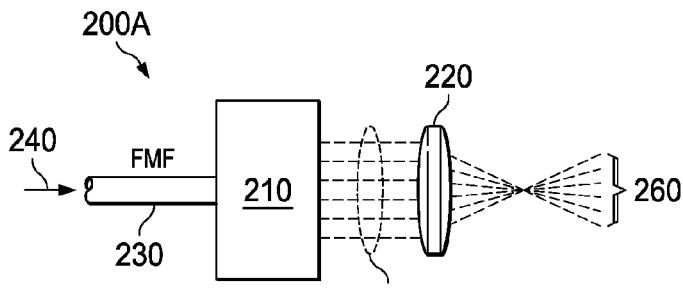

FIG. 2A illustrates one embodiment of a configuration of a bulk-optical apparatus coupling apparatus 200A. The apparatus 200A is configured to couple signals propagating via N multiple spatial modes of a multimode fiber to optical components that operate as single-mode optical processors.

The apparatus 200A includes a multimode to single-mode converter 210 and a converging lens 220. The converter 210 may be implemented, e.g. as a laser-inscribed 3D waveguide to implement an array of multi-mode to single-mode converters. A multimode fiber, which may optionally be a "few-mode" fiber (FMF) 230, delivers an optical signal 240 to the converter 210. In this context "few" may be understood to be no more than about ten. The converter 210 separates the signal 240 single-mode components and outputs individual signals 250. The lens 220 refracts the signals 250 to produce spatially separated signals 260. The spatially separated signals are each a linear combination of an orthogonal basis set of the signals propagating in the fiber 230. The signals 260 may then be coupled, e.g. end-coupled, to single-mode fibers and guided to a bulk optical function, or to a coupling element to couple to a horizontal propagation mode of a planar waveguide.

Figure 2B:
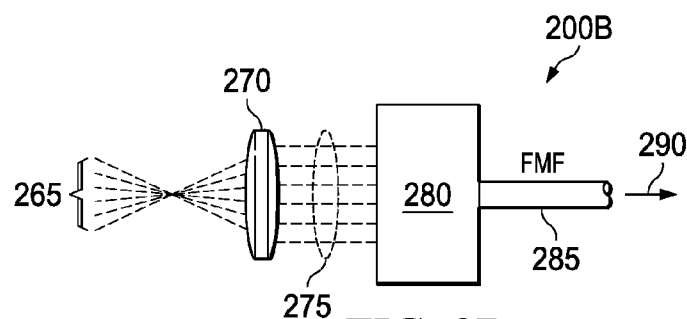

FIG. 2B illustrates an embodiment of a coupling apparatus 200B configured to couple multiple single-mode signals 265 from a bulk optical or planar apparatus such as the system 100 to multiple spatial modes of an output multimode fiber. The apparatus 200B in the illustrated embodiment is configured similarly to the apparatus 200A. In this case, a converging lens 270 receives the spatially separated signals 265 from bulk optical functions via single-mode optical fibers, or from a planar waveguide via coupling elements such as the coupling elements 125-1 ... 125-3. In the latter case, single-mode fibers, not shown, may be vertically coupled to the coupling elements 125-1 ... 125-3 and end-coupled to the lens 270. The lens 270 produces collimated signals 275. A single-mode to multimode converter 280 couples the signals 275 to multiple spatial propagation modes of an FMF 285 to produce a multimode signal 290.

Figure 2C:
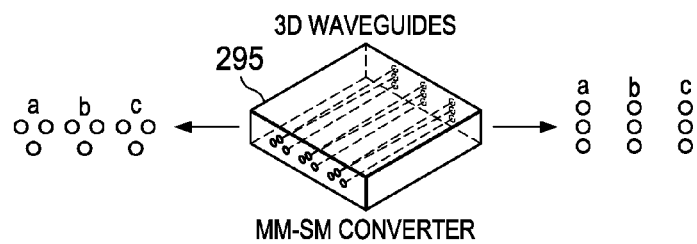

FIG. 2C presents one non-limiting example of a 3D waveguide 295 configured to operate as a multimode-to-single mode (MM-SM) converter. In a manner analogous to the operation of the mode couplers 110 and 120, the 3D coupler 295 receives light from the MMOF at input groups a, b and c. Separated single-modes from each of the MM fibers emerge at separate waveguide groups A, B and C. As described in example embodiments below, the SM signals may be processed and recombined for transmission in MM output fibers. It should be noted that the operation of the 3D waveguide 295 is symmetrical, such that SM signals received at the groups A, B and C may be converted to MM signals output at groups a, b and c.

As previously described, the orthogonal propagating modes of a multimode optical signal have specific intensity and phase relationships to each other. It is believed that while these relationships are preserved, cross-channel transfer of energy is low. However, if these relationships are altered from those of the orthogonal modes, then energy may be transferred from one mode to another mode, and information propagating in the data channels associated with those modes may be corrupted. Thus, in various embodiments the phase and intensity relationships between signals carried by the multiple propagation modes of the MM fiber are preserved at the beginning and the end of the SM optical paths used to process the optical channels.

Figure 3:
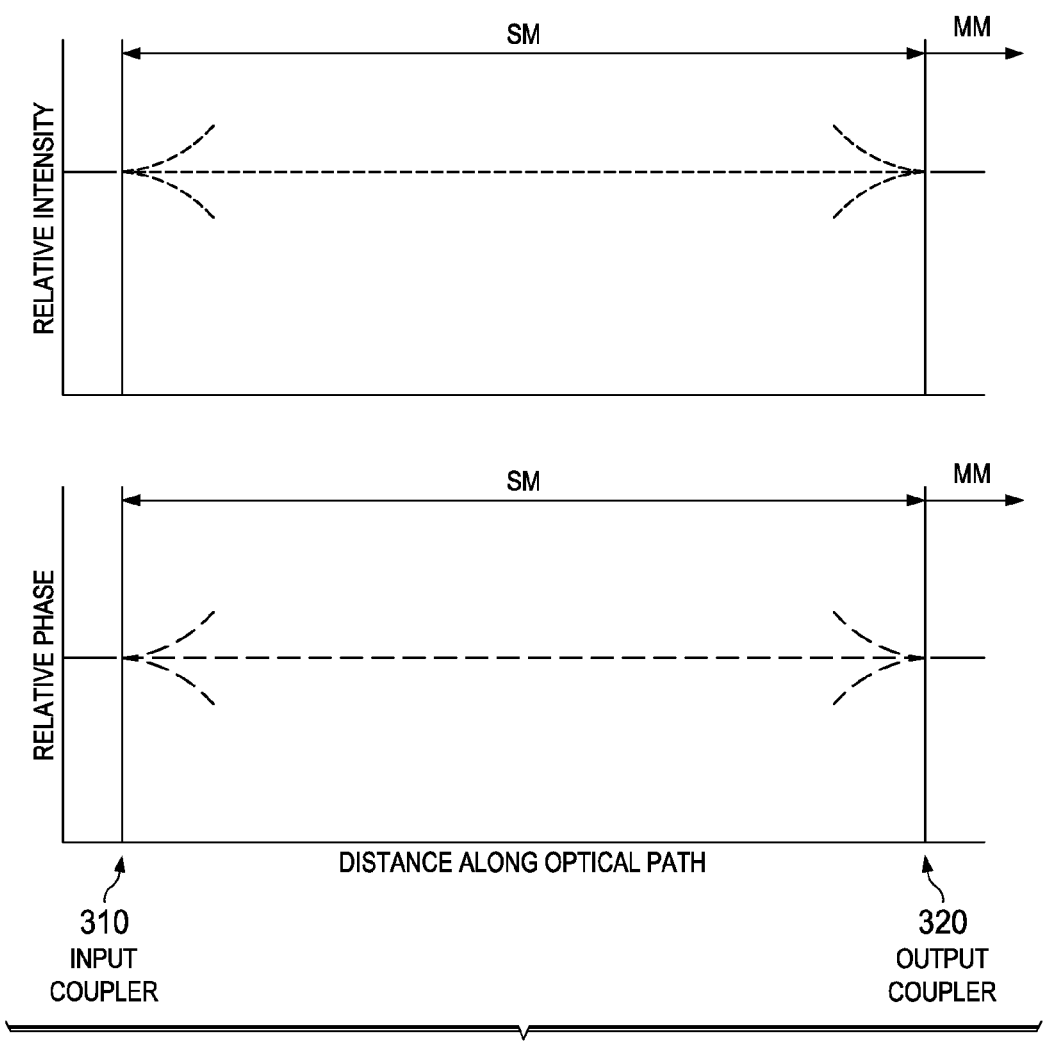
FIG. 3 illustrates aspects of the relative intensity and phase of separated spatial modes of a multimode optical signal.

FIG. 3 illustrates schematically and without limitation aspects of the preservation of relative intensity and phase of the optical signals propagating within the optical paths I-III. Each of the spatial mode components of a received multi-mode signal, e.g. the signal 240, is expected to have a particular intensity and phase relationship to the others of the components at a location 310, e.g. one of the coupling elements 115. It is expected that by preserving these relationships as accurately as possible at a location 320, e.g. one of the coupling elements 125, an output multimode signal may be regenerated and coupled to the output MMOF such that the output signal may propagate within the output MMOF without significant mixing of modes and loss of information.

The relative intensity is illustrated at an initial value at the point 310 and having substantially the same value at the point 320. In some cases the intensities of the individual optical signals may decrease, e.g. due to attenuation, or increase, e.g. due to amplification, but the relative intensities are preserved. The relative intensity of two optical signals is considered to be preserved when the relative intensity at the point 320 is within ±10% of the relative intensity at the point 310, preferably within ±5% and more preferably within ±1%. When the relative phase, and preferably also the relative intensity, of the optical signals is preserved, the attenuation and phase delay imposed by one of the optical paths I-III on an optical signal propagating therethrough may be considered to be matched to the attenuation and phase delay imposed by the others of the optical paths I III.

Between the points 310 and 320, e.g. within one of the optical paths I, II or III, the relative intensity may in principle be any value. However, in various embodiments the relative intensity may be relatively constant throughout the optical path when the waveguides 150 and 160 are matched and/or the optical functions 130 are nominally identical. Nominally identical means that any changes of intensity and phase produced by the optical functions elements 130 are equal to within about, e.g. ±10%, preferably ±5% and more preferably ±1%.

Similarly the relative phase has an initial value at the point 310 and a substantially equal final value at the point 320. Again, the relative phase may be any value between the points 310 and 320, but may preferably be about constant.

Figure 4A:
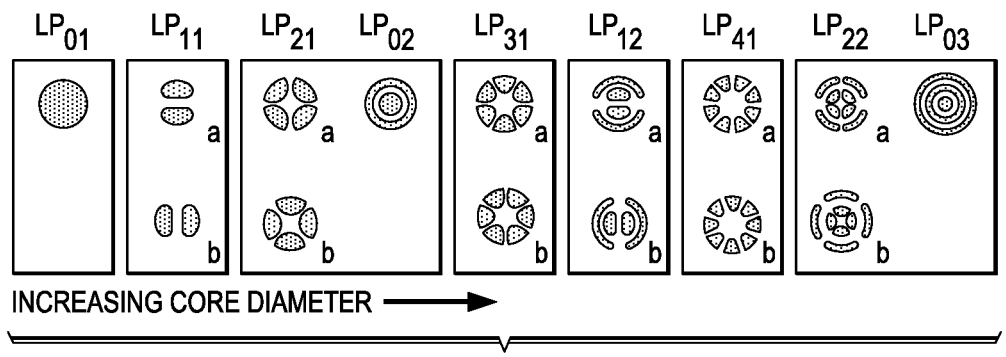
FIG. 4A illustrates distribution of optical energy for various MMOF spatial modes, grouped by increasing cut-off.
Figure 4B:
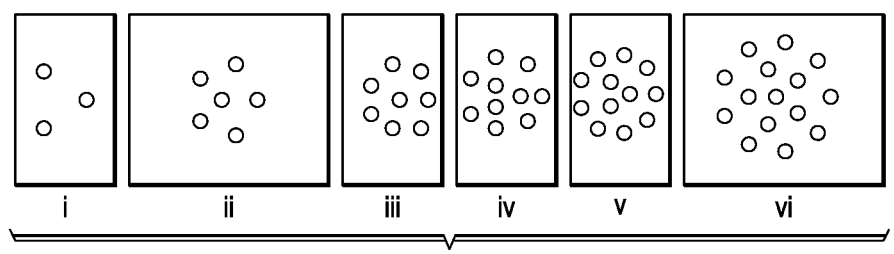
FIG. 4B illustrates embodiments of beam sampling patterns, e.g. the relative positions of the coupling elements of FIG. 1, corresponding to the MMOF spatial modes of FIG. 4A.

FIGS. 4A and 4B illustrate additional aspects of coupling optical channels between the propagating modes of a MMOF and individual fibers or waveguides. FIG. 4A illustrates spatial-modes of a FMF grouped by increasing cut-off frequency. FIG. 4B illustrates beam-sampler locations for a multi-mode fiber with N=M. The patterns in FIG. 4B may describe the relative locations of optical coupling elements, such as the coupling elements 115, configured to couple to the corresponding modal distribution. For example, pattern (i) is configured to interface to six modes supported by a MMOF, e.g. both polarizations of the $LP_{01}$ mode and two $LP_{11}$ modes. Similarly, pattern (ii) is configured to interface to 12 propagating modes, pattern (iii) is configured to interface to 16 propagating modes, and so on. Such patterns may be preferable when the beam samplers have low mode-dependent loss when interfacing the beam samplers to a FMF. These arrangements have the same number of spots as the number of modes supported by the MMOF.

In some cases it is not necessary to exactly (or nearly exactly) replicate the optical spatial pattern at the input to the input couplers, e.g. the input mode coupler 110, or at the output couplers, e.g. the output mode coupler 120. For example, during fiber transmission, spatial modes typically strongly mix. In such cases it may not be necessary for the system 100 to exactly replicate the spatial pattern received at the input mode coupler 110 to the output mode coupler 120. The system 100 may, in such embodiments, mix the spatial modes, as long as the mixing is unitary, e.g. introduces no more than a negligible mode-dependent loss. In such embodiments multimode to single-mode converters may be used that sample the beam with the number of beam samplers being the same as the number of propagation modes (N=M) such that the coupling matrix between spots and spatial-modes is unitary. In some other embodiments the beam may be over-sampled (M>N). It is believed that unitary coupling may be advantageous in a multimode to single-mode converter because it is thought that the phase relationship between the sampled optical signals need not be maintained through the device.

The relative intensity and phase of the signals may be preserved by one or more of the following features of embodiments consistent with the teachings herein. First, the waveguides 150 may be formed to have nominally equal optical path lengths. In some embodiments the waveguides 150 may also have physical path lengths that are nominally equal. Such embodiments are represented by FIG. 1, in which the waveguides 150 each have about a same physical length. Optical path length adjusters 170 may optionally be located to correct the optical path lengths of the waveguides 150 for any imperfections due to, e.g. manufacturing variation.

Second, the relative intensity and phase of the signals may be preserved by forming the waveguides 160 to have a nominally equal optical path length. Again, optical path length adjusters 170, e.g. heaters or electro-optic phase adjusters, may be located to provide optical path length adjustment. The length of the waveguides 150 may be different from the length of the waveguides 160. The particular paths of the waveguides 150 and 160 need not be otherwise limited to any particular shape or configuration. Thus, for example, the curved paths of the waveguides 150-2 and 160-2 are merely examples and presented without limitation.

Third, the optical functions 130 may impose about a same attenuation and phase shift on optical signals propagating therethrough.

In some cases the SM optical paths provide a same optical processing function, but embodiments are not limited to such cases. For example, the optical functions 130 (FIG. 1) may be or include optical filters, cross-connects, "simple" (e.g. non-wavelength dependent) switches, or wavelength selective switches. It is noted that in embodiments in which the optical functions 130 impose different attenuation and/or phase shifts on the optical signals, the waveguides 150 and 160 may have unequal lengths to compensate for such unequal phase shifting. In some embodiments one or more amplifiers (not shown) may be placed in one or more of the SM optical paths, e.g. the paths I, II and III, to compensate for unequal path attenuation.

The optical functions 130 (FIG. 1) may be or include any of various optical functions, e.g. optical filters and/or wavelength selective switches and/or optical cross-connects. These or other optical functions may be placed within the optical paths I, II and III such that the relative intensity and phase of the optical signals at the input mode coupler 110 is preserved at the output mode coupler 120. Thus optical processing may be performed on the optical channels and the channels may be routed between a plurality of output multi-mode fibers.

Turning to FIG. 5, in an embodiment an apparatus 500 illustrates an embodiment consistent with the principles of the disclosure without limitation. The system 500 is shown as a planar device (e.g. a PIC), but could be implemented as a bulk-optical device. The system 500 is configured to switch optical signals received via input multi-mode optical fibers between output multi-mode fibers. The system 500 includes an input mode coupler 505 that includes coupler elements 507-1 and 507-2, and an input mode coupler 510 that includes coupler elements 512-1 and 512-2. The mode couplers 510 and 512 are shown having two coupler elements for simplicity without limitation thereto. The coupler elements 507-1, 507-2, 512-1 and 512-2 are connected to nominally identical 2×2 optical switches 525-1 and 525-2. For descriptive purposes the signals received by the coupler elements 507-1, 507-2, 512-1 and 512-2 are respectively designated Ch1, Ch2, Ch3 and Ch4.

Waveguides 515-1 and 515-2 respectively connect the coupler element 507-1 to one input of the switch 525-1 and connect the coupler element 507-2 to one input of the switch 525-2. Waveguides 520-1 and 520-2 respectively connect the coupler element 512-1 to another input of the switch 525-1 and connect the coupler element 512-2 to another input of the switch 525-2. The waveguides 515 are illustrated as solid lines and the waveguides 520 are illustrated as dashed lines to aid the discussion, but the waveguides 515 and 520 in various embodiments are nominally identical, e.g. have an equal path length and width.

The system 500 further includes an output mode coupler 530, including coupler element 532-1 and 532-2, and an output mode coupler 535, including coupler elements 537-1 and 537-2 connected to the optical switches 525-1 and 525-2.

Waveguides 540-1 and 545-1 respectively connect the coupler element 532-1 to one output of the switch 525-1 and connect the coupler element 532-2 to another output of the switch 525-1. Waveguides 540-2 and 545-2 respectively connect the coupler element 532-2 to one output of the switch 525-2 and connect the coupler element 537-2 to another output of the switch 525-2. The waveguides 540-1 and 545-2 are illustrated as dashed lines and the waveguides 540-2 and 545-1 are illustrated as solid lines for descriptive purposes, but again the waveguides 540 and 545 may be nominally identical, e.g. have an equal path length.

The switches 525 may be controlled by a selector 550 to selectively route data between the input mode couplers 505 and 510 and the output mode couplers 530 and 535. For example, in the illustrated embodiment the selector 550 may control the switch 525-1 to route the optical channel Ch1 either to the coupler element 532-1 or to the coupler element 537-1. The channel Ch2 may be routed either to the coupler element 532-2 or to the coupler element 537-2. The channel Ch3 may be routed either to the coupler element 532-1 or to the coupler element 537-1. The channel Ch4 may be routed either to the coupler element 532-2 or to the coupler element 537-2. It will be apparent that the selector 550 may thereby switch the optical channels such that they may be combined in four ways among the output mode couplers 530 and 535, and may thereby be switched among spatial modes of the multi-mode optical fibers coupled to the output mode couplers 530 and 535. Selector states 1-4 shown in the table inset to FIG. 4 are correlated with four possible permutations of the routing of the channels Ch1-Ch4 to the coupler elements 532-1, 532-2, 537-1 and 537-2. Selector states 1 and 4 preserve the transmission of Ch1 and Ch2 on a single multimode fiber, and Ch3 and Ch4 on another multimode fiber. However, selector states 2 and 3 combine Ch1 and Ch4 on one multimode fiber, and Ch2 and Ch3 on another multimode fiber. Such mixing of channels may cause the data conveyed by the channels to be scrambled. Thus it may be preferable to limit operation of the system 500 to using selector states 1 and 4 only.

Figure 6:
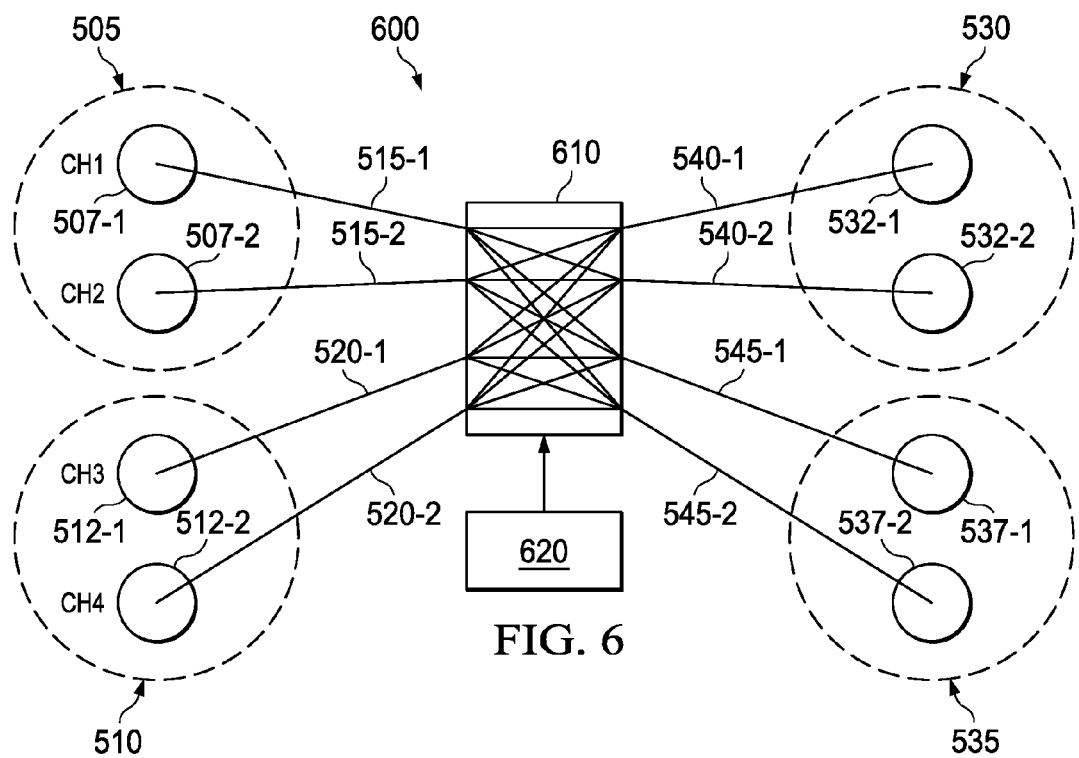
FIG. 6 illustrates an embodiment of a system configured to switch channels of multimode optical signals between multiple propagating modes of one or more input MMOFs and one or more output MMOFs using an optical cross-connect.

FIG. 6 illustrates another embodiment, an apparatus 600 that includes an optical cross-connect 610. Elements of the apparatus that are common to the apparatus 500 retain the same designations. The waveguides 515-1, 515-2, 520-1 and 520-2 connect the coupler elements 507-1, 507-2, 512-1 and 512-2 to inputs of the cross-connect 610. The waveguides 540-1, 540-2, 545-1 and 545-2 connect the coupler elements 532-1, 532-2, 537-1 and 537-2 to outputs of the cross-connect 610. A selector 620 is configured to operate the cross-connect 610 to selectively route an optical signal received at a particular one of the selector 620 inputs to a selected one of the selector 620 outputs. In this manner any of the channels CH1, CH2, CH3 and CH4 received via the optical couplers 505 and 510 may be routed to a selected one of the coupler elements 532-1, 532-2, 537-1 and 537-2.

Figure 7:
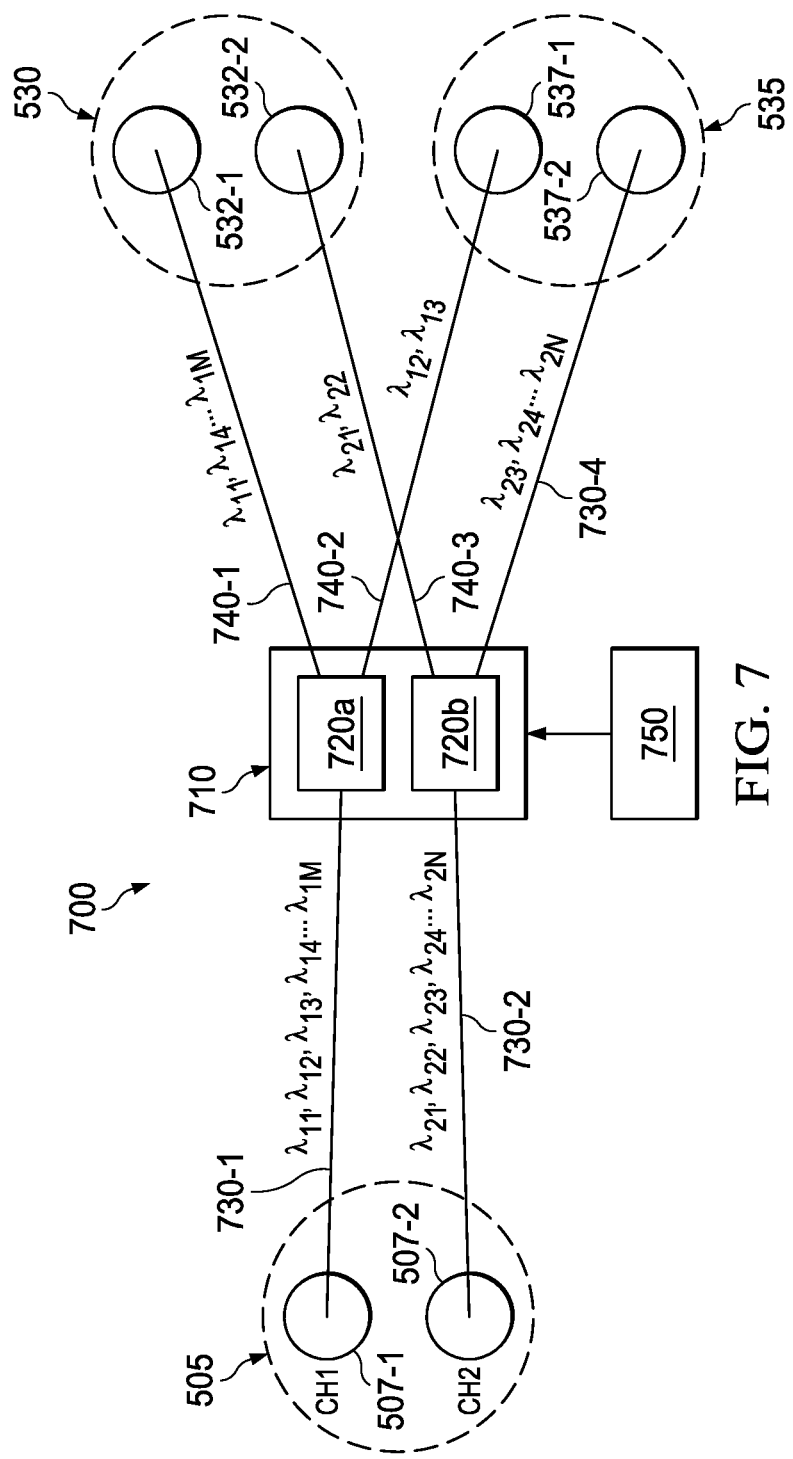
FIG. 7 illustrates an embodiment of a system configured to switch wavelength channels of multimode optical signals between multiple propagating modes of one or more input MMOFs and one or more output MMOFs using a wavelength selective switch.

FIG. 7 illustrates another embodiment, an apparatus 700 that includes a wavelength-selective optical switch 710. The apparatus 700 is described without limitation as being implemented as a PIC, e.g. including the previously-described input mode coupler 505 and output mode couplers 530 and 535. The switch 710 includes, e.g. two subswitches 720a and 720b. The subswitch 720a receives a chromatically disperse signal via an input port 730-1, illustrated as including wavelength channels $\lambda_{11}, \lambda_{12}, \lambda_{13}, \lambda_{14} \ldots \lambda_{1M}$. The subswitch 720b receives a chromatically disperse signal via an input port 730-2, illustrated as including wavelength channels $\lambda_{21}, \lambda_{22}, \lambda_{23}, \lambda_{24} \ldots \lambda_{2N}$. Under control by a selector 750, the subswitch 720a may route via an output port 740-1a a subset of the channels received at the input port 730-1, e.g. $\lambda_{11}, \lambda_{14} \ldots \lambda_{1M}$, to the coupler element 532-1. The subswitch 720a may route via an output port 740-2 a remaining subset of the channels received at the input port 730-1, e.g. $\lambda_{12}$ and $\lambda_{13}$, to the coupler element 537-1. Similarly, under control by the selector 750, the subswitch 720b may route via an output port 740-3 a subset of channels received at the input port 730-2 to the coupler element 532-2, e.g. $\lambda_{21}$ and $\lambda_{22}$. The subswitch 720b may route via an output port 740-4 a remaining subset of the channels received at the input port 730-2, e.g. $\lambda_{23}$, $\lambda_{24} \ldots \lambda_{2N}$, to the coupler element 537-2. When the input mode coupler 505 is coupled to, e.g. an input FMF, and the output mode couplers 530 and 535 are coupled to, e.g. respective output FMFs, the apparatus 700 may operate to controllably switch selected subsets of channels of received chromatically disperse signals as desired among the output FMFs.

Figure 8A:
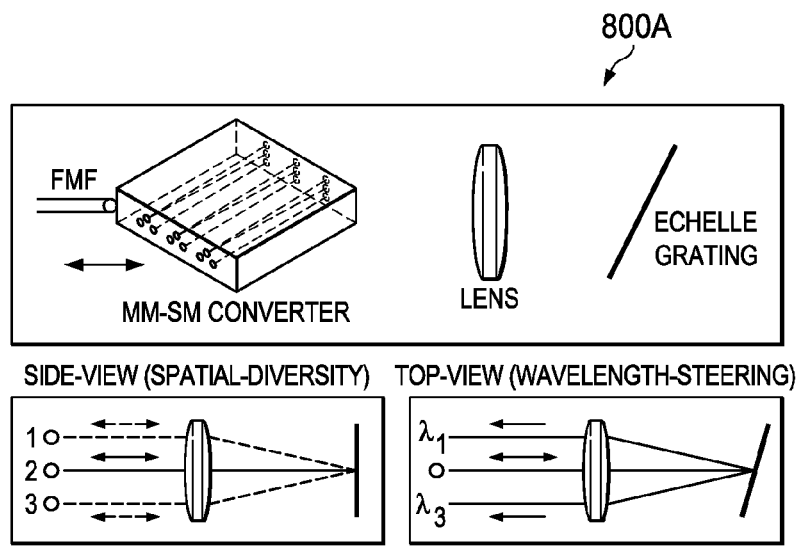
FIGS. 8A-8C illustrate aspects of embodiments implemented with bulk-optical components.
Figure 8B:
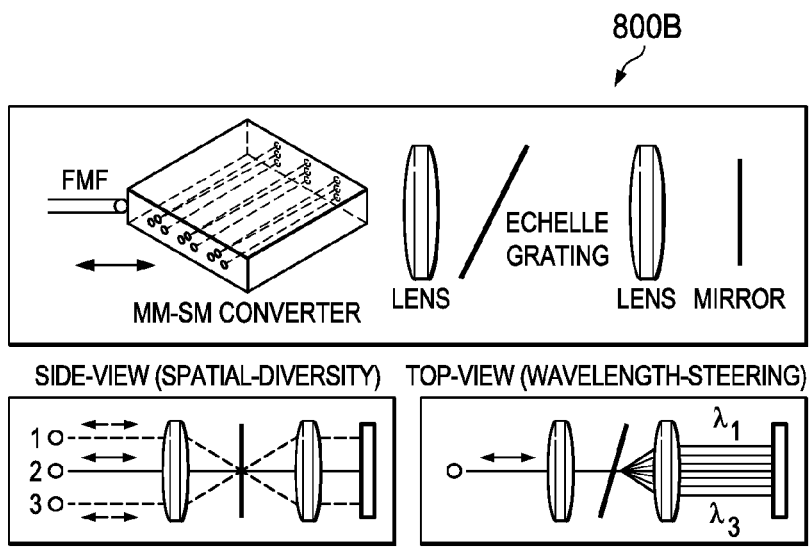
Figure 8C:
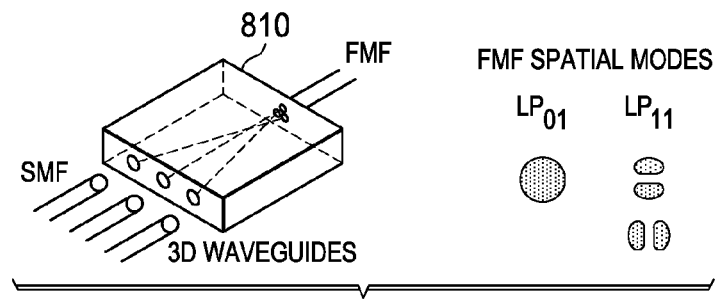

FIGS. 8A-8C illustrate aspects of two space-division multiplexing devices representing additional embodiments based on principles described herein, e.g. bulk-optical processing apparatus. FIG. 8A shows an apparatus 800A that may provide a Gaussian-passband filter function. FIG. 8B shows an apparatus 800B that may provide a wavelength blocker function. FIG. 8C shows a MM-SM converter 810 such as described in FIG. 2C, which in the present embodiments may convert the samples of the FMF modes to several Gaussian beams arranged vertically. The converter 810 operates as a three spot coupler that multiplexes the two polarization modes of three SMFs onto the six spatial and polarization modes of a FMF.

The apparatus 800A (FIG. 8A) shows a reflective filter using the 3D waveguide MM-SM converter to implement spatial-diversity. In the wavelength dimension, the lens collimates the beams, and the diffraction grating disperses and reflects the different wavelengths back towards the input ports. In the spatial-diversity dimension the filter is parallelized such that the transmission from spots 2-to-2 and from 1-to-3 are the same.

The apparatus 800B (FIG. 8B) shows the operation principle of the wavelength blocker with spatial-diversity. In this embodiment, the blocker is folded around the grating. In the wavelength dimension, the lens system images the spectrum as a line across the mirror which reflects selected wavelengths back to the input. In the spatial-diversity dimension, each spot is imaged to a separate vertical location on the mirror, and all spots are imaged back onto themselves. In various embodiments, the lens may have a 100 mm focal length and the Echelle grating's dispersion may be similar to a grating having about 1100 lines/mm.

The principles described with respect to the systems 100, 500, 600, 700, 800A and 800B may be extended to a greater number of input and output multimode fibers, or extended to a greater number of spatial modes of the fibers. Embodiments of systems described herein. By way of example, in the case of a planar device, and without limitation, the system 100 may be formed over a semiconductor substrate, e.g. a silicon wafer. In some cases the substrate may be a silicon-on-insulator (SOI) substrate, providing on a silicon oxide layer a crystalline silicon core layer. The mode couplers 110 and 120, optical functions 130 and waveguides 150 and 160 may be formed by, e.g. conventional processing steps such as patterning and etching of the silicon layer. A dielectric cladding layer may be formed over the various patterned silicon features. Those skilled in the pertinent art are capable of determining specific manufacturing steps without undue experimentation. While the preceding description refers to silicon features, embodiments are not limited thereto. In other embodiments, for instance, the mode couplers 110 and 120, waveguides 150 and 160 and optical functions 130 may be formed from other materials on a suitable substrate. For example, InP, $LiNbO_3$, GaAs or any other material may be suitably fashioned into the described features.

Figure 9:
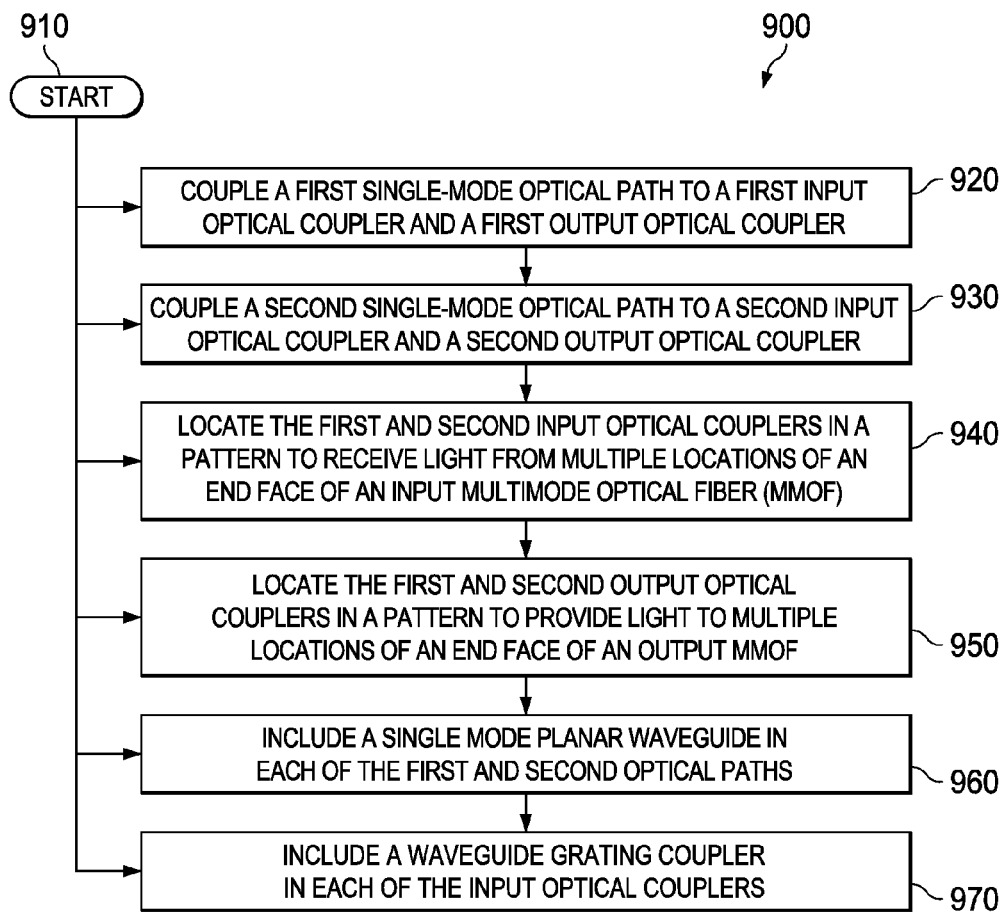
FIG. 9 illustrates an embodiment of a method, e.g. for forming an apparatus such as exemplified by FIGS. 1 and/or 5-8.

Turning to FIG. 9, a method 900 is presented, e.g. for forming the systems 100, 500, 600, 700, 800A or 800B, according to various embodiments. The steps of the method 900 are described, without limitation thereto, with reference to elements previously described herein, e.g. in FIGS. 1-8. The steps of the method 900 may be performed in another order than the illustrated order, and in some embodiments may be omitted altogether and/or performed concurrently or in parallel groups. This method 900 is illustrated without limitation with the steps thereof being performed in parallel fashion, such as by concurrent processing on a common substrate. Other embodiments, e.g. those utilizing multiple substrates, or employing bulk optical components, may perform the steps partially or completely sequentially and in any order.

The method 900 begins with an entry 910. In a step 920 a first single-mode optical path, e.g. the waveguide core 150-1, is coupled to a first input optical coupler and a first output optical coupler, e.g. the coupling elements 115-1 and 125-1. In a step 930 a second single-mode optical path, e.g. the waveguide core 150-2, is coupled to a second input optical coupler and a second output optical coupler, e.g. the coupling elements 115-2 and 125-2. In a step 940 the first and second input optical couplers are located in a pattern, e.g. one of the patterns shown in FIG. 4B(i-vi), to receive light from multiple locations of an end face of an input multimode optical fiber. In a step 950 the first and second output optical couplers are located in a pattern, e.g. one of the previously referenced patterns, to provide light to multiple locations of an end face of an output multimode optical fiber. In a step 960, which may be performed for PIC embodiments, a single-mode planar waveguide is included in each of the first and second optical paths. In a step 970, which may also be performed in some such embodiments, a waveguide grating coupler is included in each of the input optical couplers.

Those skilled in the art to which this application relates will appreciate that other and further additions, deletions, substitutions and modifications may be made to the described embodiments.

What is claimed is:

1. An apparatus, comprising:
   a first plurality of input optical couplers placed in a first pattern to each receive light from corresponding different ones of multiple locations of an end face of an input multimode optical fiber;
   a second plurality of output optical couplers placed in a second pattern configured to provide light to corresponding different ones of multiple locations of an end face of an output multimode optical fiber; and
   a plurality of single-mode optical paths, each of said single-mode optical paths connected to a corresponding one of said input optical couplers and a corresponding one of the output optical couplers.

2. The apparatus as recited in claim 1, wherein said input multimode optical fiber and said output multimode optical fiber each support N spatial propagation modes, said first and second patterns each include M of said optical couplers, and N equals M.

3. The apparatus as recited in claim 1, wherein said input multimode optical fiber and said output multimode optical fiber each support N spatial propagation modes, said first and second patterns each include M of said optical couplers, and M is greater than N.

4. The apparatus as recited in claim 1, wherein said single-mode optical paths each include one of a plurality of nominally identical optical functions.

5. The apparatus as recited in claim 4, wherein said optical functions each comprise an optical switch configured to route light from said multimode optical fiber to a selectable one of a plurality of output multimode optical fibers.

6. The apparatus as recited in claim 1, wherein said single-mode optical paths each include single-mode planar waveguides located on a planar photonic circuit substrate.

7. The apparatus as recited in claim 1, wherein each of said single-mode optical paths includes a single-mode optical fiber.

8. The apparatus as recited in claim 1, wherein each of said single-mode optical paths is configured to impose about a same phase delay on an optical signal propagating between the input optical coupler and the output optical coupler connected thereto.

9. The apparatus as recited in claim 1, wherein each of said single-mode optical paths is configured to impose about a same attenuation on an optical signal propagating between the input optical coupler and the output optical coupler connected thereto.

10. The apparatus as recited in claim 1, wherein each of said single-mode optical paths is configured to impose about a same phase delay and a same attenuation on an optical signal propagating between the input optical coupler and an output optical coupler connected thereto.

11. The apparatus of claim 1, wherein each of said single-mode optical paths includes a path through an optical switch.

12. The apparatus of claim 11, wherein said optical switch is a wavelength-selective optical switch.

13. The apparatus of claim 1, wherein each of said single-mode optical paths includes a path through an optical cross-connect.

14. The apparatus as recited in claim 1, further comprising said input multimode optical fiber and said output multimode optical fiber.

15. The apparatus of claim 1, wherein each of said single-mode optical paths includes one of a corresponding plurality of waveguides, wherein all of said corresponding plurality of waveguides have about a same physical path length.

16. The apparatus of claim 1, wherein each of said single-mode optical paths includes a planar waveguide, each of said planar waveguides having a silicon core region formed over a planar silicon substrate.

17. The apparatus of claim 1, wherein said single-mode optical paths are configured to propagate signals in the optical S, C, or L bands.

18. The apparatus of claim 1, wherein said input optical couplers and said output optical couplers each comprise a waveguide grating coupler.

19. The apparatus of claim 1, wherein said input optical couplers and said output optical couplers each comprise a 3D waveguide.

20. A method, comprising:
coupling a first single-mode optical path to a first input optical coupler and a first output optical coupler;
coupling a second single-mode optical path to a second input optical coupler and a second output optical coupler; and
placing the first and the second input optical couplers in a pattern configured to receive light from corresponding first and second locations of an end face of an input multimode optical fiber.

21. The method as recited in claim 20, wherein said first and said second output optical couplers are placed in a pattern of first and second locations configured to provide light to corresponding first and second locations of an end face of an output multimode optical fiber.

22. The method as recited in claim 20, wherein each of said first and said second single-mode optical paths includes a single-mode planar waveguide.

23. The method as recited in claim 20, wherein said first and said second input optical couplers each include a waveguide grating coupler.

* * * * *